Patented Dec. 26, 1950

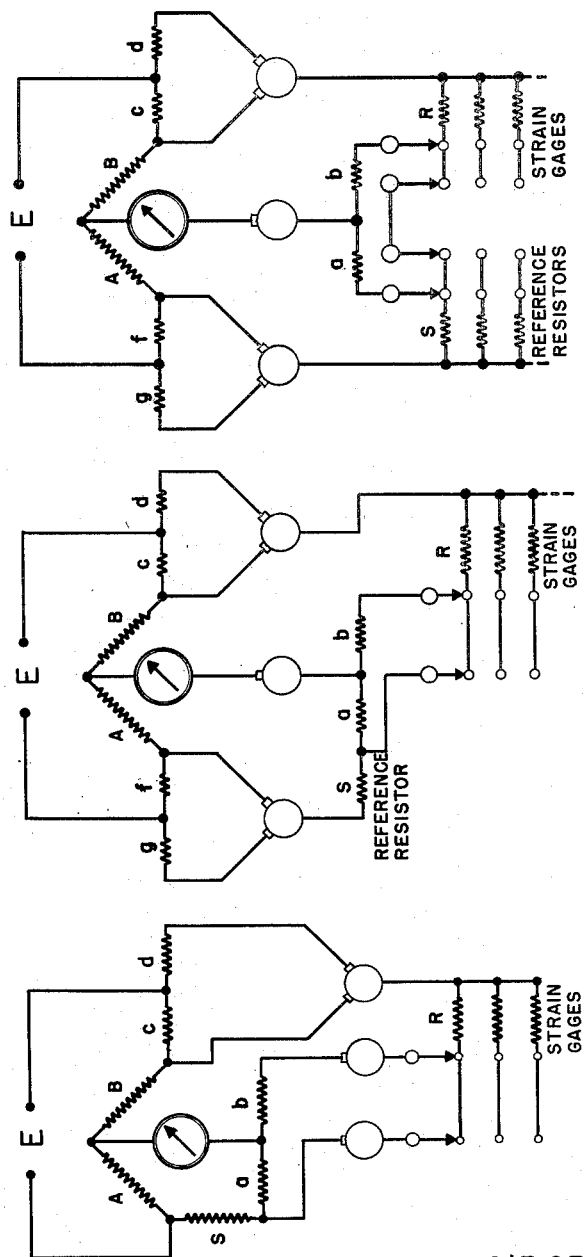

2,535,108

UNITED STATES PATENT OFFICE 2,535,108

MULTIPLE BRIDGE CIRCUIT

Isidore Warshawsky, Rocky River, Ohio

Application April 24, 1947, Serial No. 743,579

2 Claims. (Cl. 323—75)

(Granted under the act of March 3, 1883, as amended April 30, 1928; 370 O. G. 757)

This invention relates to improvements in means for eliminating effects of impedance occurring at the junctions of the arms of an electrical bridge network. By a "bridge network" or "bridge" is meant any arrangement of electrical impedances which are arranged in a manner similar to that of the basic Wheatstone bridge or in any of the variations or modifications of that circuit, generally for the purpose of measurement or comparison of the electrical impedance that exists between one or more pairs of terminals of the network. The arms of such a network may be composed in whole or in part of metallic conductors, electrolytes, dielectrics, electronic tubes, or other electrical elements.

Existing means of use of the basic Wheatstone bridge or its variations are troubled by the electrical resistance or impedance that occurs at the main junctions between said main arms. For example, an electrical resistance or impedance may occur at any or all of said junctions. This junction impedance may be due to the resistance in a merely twisted or badly soldered joint, it may be due to the resistance between two switch contacts, the resistance between a brush and a slip ring or commutator, the resistance of leads themselves (which are electrically equivalent to a junction resistance), the film between an electrode and an electrolyte, the electrical capacity between the leads, or any other cause. Junction impedance may occur at any or all of the corners, simultaneously or at random times. The only approach to solution of the problem of junction resistance has been that of Lord Kelvin and his Kelvin bridge. His solution serves to eliminate only the single junction resistance where the arms are joined to the indicator. No solution has existed for eliminating, simultaneously, the effects of resistance or impedance which occurs at the other junctions, and the art of measurement or comparison of resistances to high accuracy has suffered thereby.

Resistance strain gage measurements made through slip rings or switch contacts are often limited in accuracy by the effects of contact resistance variations occurring at these points. These errors may be reduced several hundredfold if my specially compensated bridge network invention is used. This invention is particularly applicable to measurements of steady and alternating strains in rotating shafts or propeller blades, and to multi-point strain measurements.

In the measurement of structural strains by observing the change in electrical resistance of a wire or a carbon strip attached to the surface of the test member, it is necessary to detect accurately a resistance change of a fraction of one per cent. The fractional change in resistance of a wire strain gage is approximately twice the numerical value of the elastic strain, so that a stress of 10,000 pounds per square inch in aluminum involves a resistance change of 0.2 per cent. In order to achieve an accuracy of two per cent in such a measurement, the resistance must be measured to an accuracy of 0.004 per cent.

Although resistance changes of small magnitudes may be measured quite readily by ordinary bridge methods in those cases where direct connection to a strain gage can be made through well-soldered connections, the problem becomes quite difficult when connections must be made through slip rings or through switch contacts. Examples of the latter situations are the measurement of stresses in a rotating shaft or propeller blade, and the measurement of stresses at a number of locations by using a single bridge and a multiple-position selector switch.

In such cases, the possible variation in contact resistance between brush and slip ring or between switch contacts may be of the same order of magnitude as the resistance change due to actual strain variation, and if this contact resistance lies in series with the strain gage itself large errors are introduced into the measurements. To remedy this situation, several expedients are generally employd: first, circuits so constructed that the contact resistance no longer lies in series with the strain gage but occurs instead at a point in the circuit where it has negligible effect; second, the use of strain gages of very high resistance; and third, the use of very heavy switch contacts or of a number of parallel connected brushes. Each of these methods sometimes possesses certain limitations: the first often requires an excessively large number of resistors when applied to multiple-point measurements; the second sacrifices electrical stability; and the third is mechanically complicated. On the other hand, if the usual wiring diagrams are modified in accordance with my invention, it is possible, with little sacrifice of other conveniences to render negligible or to eliminate completely the problems of contact resistance.

The principal object of my invention is to provide simple circuit means for simultaneously eliminating the undesirable effects of contact impedances that occur at the junctions of an electrical bridge network.

Further objects and advantages will be pointed out in the following description, when taken in conjunction with the drawings, in which:

Fig. 1 is an application of my invention wherein multiple-point measurements are made thru slip rings, and characterized further by a common reference resistor for all strain gages, the reference resistor being mounted on a fixed member.

Fig. 2 is a modification of Fig. 1 wherein the reference resistor is mounted on a rotatable member.

Fig. 3 is another modification of Fig. 1 wherein a separate reference resistor is provided for each strain gage, the reference resistors being mounted on the rotatable member.

The most general circuit of this type is built up from the simple Wheatstone bridge circuit, wherein a contact resistance is assumed to occur at the four corners of the bridge. Each of these original contact resistances is then bridged by a pair of auxiliary arms whose ratio to each other is equal to the ratio between the adjacent or opposite main arms. Connection between the auxiliary arms and the main arms is made through a separate brush or switch contact, and the power lead that originally went to the corner of the simple bridge is connected instead to the junction of the two auxiliary arms. This construction has the effect of canceling first-order effects of the contact resistance occurring at any corner of the original bridge because this resistance is, in effect, divided between two adjacent main arms in the same proportion as the ratio of these main arms.

In the practical application of the multiple-bridge circuit to resistance strain-gage measurements, the use of separate contacts for connecting the strain gage to the main bridge arms and to the auxiliary ratio arms does not mean that more than two wires need be led off from each gage; the application requires only that two connections instead of one, be made at the slip ring or the switch at which the contact resistance occurs. Furthermore, all four pairs of auxiliary ratio arms are rarely needed; most applications utilize no more than two pairs. These conditions are illustrated by the following representative circuits as applied to measurements on a plurality of strain gages attached to a rotating member, using only a few slip rings.

The circuit of Fig. 1 has one side of all gages R common, uses a two-pole switch, and requires two slip rings with one brush on each and one slip ring with both primary and secondary brushes. This latter ring is connected to the common side of gages R and has its brushes connected across opposite ends of series connected auxiliary ratio-arm resistors $c$ and $d$. The other brushes are connected between the terminals of the switch and opposite ends, respectively of series connected auxiliary ratio-arm resistors $a$ and $b$.

The main bridge circuit comprises gage R, reference impedance S and interconnected impedance arms A and B. The source of potential E is connected between the junction point of arm A and impedance S and the junction of auxiliary resistors or arms $c$ and $d$. The indicating instrument is connected between the junction of arms A and B and the junction of auxiliary arms $a$ and $b$. The auxiliary ratio arms $a$, $b$, and $c$, $d$ act as potential dividers across the contact resistance occurring in the main bridge circuit. The values of these resistors must be such that $A/B = a/b$ and $A/S = c/d$. Very good compensation is obtained if the auxiliary resistors are 1,000 times the probable contact resistance.

The divider $a$, $b$ at the lowest corner of the bridge will be recognized as that of the usual Kelvin double bridge. The divider $c$, $d$ at the right-hand corner is an additional compensating network that is not found in the usual Kelvin bridge because the Kelvin bridge is ordinarily used for measurements wherein contact resistance in series with the main ratio arms produces negligible errors. On the other hand, resistance-strain-gage measurements that must detect resistance changes of a few thousandths of 1 percent would be in serious error if contact-resistance variations of the same magnitude occurred in the main ratio arms.

The error that results, expressed as the apparent fractional change in resistance of the strain gage, is of the order of magnitude of the square of the ratio of the contact resistance to the bridge-arm resistance, rather than the first power of this ratio as it would be in a similar bridge circuit without auxiliary ratio arms. Specifically, assuming the same contact resistance at each of the brushes, this second-order error is the sum of two terms, one term being proportional to the square of the contact resistance and the other term varying as the product of the contact resistance by the amount of bridge unbalance. The error is thus least when the bridge is balanced and increases as the bridge becomes unbalanced by the increase in strain. The ratio between errors in the two types of bridge, which might be termed the "factor of advantage," is between 110 and 4000. This factor of advantage would be still greater if the assumed contact resistance were 0.1 ohm rather than 1 ohm.

In the conventional Wheatstone bridge any constant contact resistance may be balanced out in the initial balancing of the bridge and only the subsequent variations in this contact resistance are material, the error being proportional solely to these variations. In the multiple bridge, errors due solely to the constant contact resistance may also be balanced out, but the additional errors introduced by subsequent variations in the contact resistances are proportional not only to these variations but also to the contact resistances themselves. This condition is a consequence of the fact that errors in the multiple bridge are of the second order, whereas errors in the simple Wheatstone bridge are of the first order.

For null measurements, it is obvious the bridge of Fig. 1 may be balanced by using a dummy gage on a calibrated cantilever in arm S, by shunting arm S, by changing the main ratio arms, or by changing the position of the battery connection.

The circuits of Figs. 2 and 3 require three slip rings, two with main and auxiliary brushes. The reference resistors and the auxiliary ratio arms for the meter circuit are carried on the rotating member. Balance is obtained by changing the main ratio arms. The circuit of Fig. 2 uses the same compensating resistor for all strain gages and requires a two-pole switch, whereas the circuit of Fig. 3 uses a separate compensating resistor for each gage and requires a four-pole switch.

In Fig. 2, one of the rings with two brushes is connected between the common sides of gages R and auxiliary arms $c$ and $d$, as in Fig. 1. The other ring with two brushes is connected between one side of reference impedance S and another pair of auxiliary arms $f$ and $g$. The third slip ring is connected between the common junction of auxiliary arms $a$ and $b$ and the indicating instrument. The ratio of the values of auxiliary arms $f$ and $g$ is equal to the ratio of the values of auxiliary arms $c$ and $d$.

The circuits described for elimination of contact-resistance errors are intended merely to illustrate the techniques to be used and manifestly do not include every conceivable circuit that might be employed. The majority of the circuits outlined require the application of one or both of two expedients: first, the use of "auxiliary" ratio arms, and second, the use of separate "main" and "auxiliary" terminals. The result of these procedures is to make the errors approximately proportional to the square of the ratio of the contact resistance to the bridge-arm resistance instead of to the first power of this ratio, as would occur in a similar circuit without multiple-bridge features.

The effect of adding the auxiliary ratio arms can be described more exactly in the following manner: if, in a simple Wheatstone bridge, the error, expressed as the apparent fractional change in resistance of the variable arm, is of the order of magnitude of the ratio of contact resistance to bridge-arm resistance, then adding the auxiliary arms reduces this error by a factor of the order of magnitude of the ratio of contact resistance to auxiliary-arm resistance. As a result, the usual stringent limitations on contact resistance may be relaxed several hundredfold, the improvement in accuracy thus obtained being greater than the improvements obtained by the expedients of multple brushes or of high-resistance carbon strain gages. The elimination of errors due to contact resistance is accomplished with little mechanical complication and only a moderate reduction in sensitivity of the measuring circuit.

The above description applies also if the word "impedance" were used in place of "resistor" or "resistance."

The invention described herein may be manufactured and used by or for the Government of the United States of America for governmental purposes without the payment of any royalties thereon or therefor.

What is claimed is:

1. A bridge network, comprising: an electrical bridge having four impedance arms, two arms comprising a shunt path of said bridge consisting of a reference resistor and at least one impedance strain gage selectively connected into said bridge thru means including a pair of synchronously rotatable slip-rings, a switch having a pair of input contacts rotatable therewith one being connected to a slip-ring thru said reference resistor said slip-ring being connected to an adjacent arm of said bridge thru a brush and the other input contact being connected to said reference resistor thru a pair of series connected auxiliary impedances the common connection between said auxiliary impedances being connected to the other of said paired slip-rings, which is provided with a brush adapted for an electrical connection thereto, at least a pair of interconnected output contacts complementary to said input contacts connected to synchronously rotatable third slip-ring thru said strain-gage said third slip-ring being connected to the remaining bridge arm thru a brush, and a second pair of series connected auxiliary impedances connecting each of the adjacent arms to the first and third slip-rings thru brushes, the common connection between said auxiliary impedances of each of the second pairs being adapted for electrical connection to opposite terminals of the bridge, respectively.

2. A bridge network, comprising: a pair of interconnected impedance arms, the common connection therebetween forming one terminal of the network; a reference impedance; means connecting one end of said impedance to the free end of one of said arms; at least one impedance strain gage; a switch having a pair of output contacts connectible to one end of said gage, said switch having a pair of input contacts complementary to said output contacts, one input contact being connected to the other end of said impedance; a pair of series connected auxiliary impedances connecting the other input contact to said other end of said reference impedance, the common connection between said auxiliary impedances forming a terminal of the network opposite said one terminal; means connecting the free end of the other of said arms to the other end of said gage; and a second pair of series connected auxiliary impedances connecting said free end of each of said arms to its associated connecting means, the common connections between the second pairs of said auxiliary impedances forming opposite terminals of the network, respectively.

ISIDORE WARSHAWSKY.

REFERENCES CITED

The following references are of record in the file of this patent:

UNITED STATES PATENTS

| Number | Name | Date |
| --- | --- | --- |
| 2,069,509 | Stickney | Feb. 2, 1937 |
| 2,285,118 | Jones | June 2, 1942 |
| 2,296,409 | Wannamaker | Sept. 22, 1942 |
| 2,423,620 | Ruge | July 8, 1947 |
| 2,434,438 | Ruge | Jan. 13, 1948 |